US012348305B2

(12) United States Patent
Chintalapudi et al.

(10) Patent No.: US 12,348,305 B2
(45) Date of Patent: Jul. 1, 2025

(54) MULTIDIMENSIONAL SERVICE DIFFERENTIATION FOR WiFi TRAFFIC

(71) Applicant: Microsoft Technology Licensing, LLC, Redmond, WA (US)

(72) Inventors: Krishna Kant Chintalapudi, Redmond, WA (US); Stanley William Adermann, Redmond, WA (US); Gopala Srihari Narlanka, Bellevue, WA (US); Perry Victor Lea, Eagle, ID (US); Steven William Ranta, Seattle, WA (US); Joseph Michael Schaefer, Carnation, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 630 days.

(21) Appl. No.: 17/675,976

(22) Filed: Feb. 18, 2022

(65) Prior Publication Data
US 2023/0155716 A1 May 18, 2023

Related U.S. Application Data

(60) Provisional application No. 63/279,152, filed on Nov. 14, 2021.

(51) Int. Cl.
*H04L 1/00* (2006.01)
*H04L 41/0893* (2022.01)
(Continued)

(52) U.S. Cl.
CPC ........ *H04L 1/0003* (2013.01); *H04L 41/0893* (2013.01); *H04L 65/80* (2013.01);
(Continued)

(58) Field of Classification Search
CPC ... H04L 1/0003; H04L 41/0893; H04L 65/80; H04L 1/0017; H04L 65/75; H04L 1/0009; H04W 28/24; H04W 72/23; H04W 72/54
See application file for complete search history.

(56) References Cited

U.S. PATENT DOCUMENTS 11,863,465 B1 * 1/2024 Nijim ................... H04L 47/805
2009/0176493 A1 7/2009 Yokota
(Continued)

OTHER PUBLICATIONS

"International Search Report and Written Opinion Issued in PCT Application No. PCT/US22/047783", Mailed Date: Jan. 31, 2023, 12 Pages.

*Primary Examiner* — Christopher M Crutchfield
*Assistant Examiner* — Aixa A Guadalupe Cruz
(74) *Attorney, Agent, or Firm* — Rainier Patents, P.S.

(57) ABSTRACT

A first device includes a processor, a wireless communication device in data communication with the processor, and a hardware storage device in data communication with the processor. The hardware storage device includes instructions stored thereon that, when executed by the processor, causes the host device to compare a Quality of Server Subtype (QoS-Subtype) value to a matching rule of a policy table stored on the hardware storage device, determine a transmission policy based at least partially on the QoS-Subtype value, wherein the transmission policy includes a transmission rate with a modulation and coding scheme (MCS) index based at least partially on the QoS-Subtype, and transmit a transmission to a second device according to the transmission policy.

20 Claims, 5 Drawing Sheets

| Matching Rule | Policy |
|---|---|
| QoS=0, QoS-Subtype=2, Destination MAC Address : 00:00:0A:BB:28:FC | Rate = MCS6, HW RetransmitRate = MCS4, OBSS_PD_threshold=-75dbm |
| QoS=0, QoS-Subtype=1, Destination MAC Address : 00:00:0A:BB:28:FC | Rate = MCS4, HW RetransmitRate = MCS2, |
| QoS=0, QoS-Subtype=2, Destination MAC Address : 00:00:0A:BC:28:FC | Rate = MCS7, HW RetransmitRate = MCS5, TxPower = 16dbm |

(51) Int. Cl.
*H04L 65/80* (2022.01)
*H04W 28/24* (2009.01)
*H04W 72/23* (2023.01)
*H04W 72/54* (2023.01)

(52) U.S. Cl.
CPC ........... *H04W 28/24* (2013.01); *H04W 72/23* (2023.01); *H04W 72/54* (2023.01)

(56) References Cited

U.S. PATENT DOCUMENTS

| | | | |
|---|---|---|---|
| 2010/0223363 | A1 | 9/2010 | Sarikaya et al. |
| 2014/0085045 | A1* | 3/2014 | Arrasvuori ............. G06F 3/033 340/5.1 |
| 2020/0163083 | A1 | 5/2020 | Yu et al. |
| 2022/0159718 | A1* | 5/2022 | Fang ................. H04W 74/0808 |
| 2022/0304000 | A1* | 9/2022 | Wang ..................... H04L 47/24 |
| 2022/0330088 | A1* | 10/2022 | Ina ........................ H04L 1/1848 |

* cited by examiner

| HT MCS | VHT MCS | Modulation | Coding | Data Rate 20 MHz | | Min SNR | RSSI | Data Rate 40 MHz | | Min SNR | RSSI | Data Rate 80 MHz | | Min SNR | RSSI |
|---|---|---|---|---|---|---|---|---|---|---|---|---|---|---|---|
| | | | | 800 ns | 400 ns | | | 800 ns | 400 ns | | | 800 ns | 400 ns | | |
| 0 | 0 | BPSK | 1/2 | 6.5 | 7.2 | 2 | -82 | 13.5 | 15 | 5 | -79 | 29.3 | 32.5 | 8 | -76 |
| 1 | 1 | QPSK | 1/2 | 13 | 14.4 | 5 | -79 | 27 | 30 | 8 | -76 | 58.5 | 65 | 11 | -73 |
| 2 | 2 | QPSK | 3/4 | 19.5 | 21.7 | 9 | -77 | 40.5 | 45 | 12 | -74 | 87.8 | 97.5 | 15 | -71 |
| 3 | 3 | 16-QAM | 1/2 | 26 | 28.9 | 11 | -74 | 54 | 60 | 14 | -71 | 117 | 130 | 17 | -68 |
| 4 | 4 | 16-QAM | 3/4 | 39 | 43.3 | 15 | -70 | 81 | 90 | 18 | -67 | 175.5 | 195 | 21 | -64 |
| 5 | 5 | 64-QAM | 2/3 | 52 | 57.8 | 18 | -66 | 108 | 120 | 21 | -63 | 234 | 260 | 24 | -60 |
| 6 | 6 | 64-QAM | 3/4 | 58.5 | 65 | 20 | -65 | 121.5 | 135 | 23 | -62 | 263.3 | 292.5 | 26 | -59 |
| 7 | 7 | 64-QAM | 5/6 | 65 | 72.2 | 25 | -64 | 135 | 150 | 28 | -61 | 292.5 | 325 | 31 | -58 |
| | 8 | 256-QAM | 3/4 | 78 | 86.7 | 29 | -59 | 162 | 180 | 32 | -56 | 351 | 390 | 35 | -53 |
| | 9 | 256-QAM | 5/6 | | | 31 | -57 | 180 | 200 | 34 | -54 | 390 | 433.3 | 37 | -51 |

FIG. 4

MULTIDIMENSIONAL SERVICE DIFFERENTIATION FOR WiFi TRAFFIC

CROSS-REFERENCE TO RELATED APPLICATIONS

This application claims priority to and the benefit of U.S. Provisional Patent Application No. 63/279,152, filed on Nov. 13, 2021, which is hereby incorporated by reference in its entirety.

BACKGROUND

Background and Relevant Art

Accessory devices communicate with a host device to send and receive information from a host application. Multiple accessory devices can allow multiple users to interact with the host device at the same time. When multiple accessory devices communicate with the host device, delays and interference can occur.

BRIEF SUMMARY

In some embodiments, a host device includes a processor, a wireless communication device in data communication with the processor, and a hardware storage device in data communication with the processor. The hardware storage device includes instructions stored thereon that, when executed by the processor, causes the host device to compare a Quality of Server Subtype (QoS-Subtype) value to a matching rule of a policy table stored on the hardware storage device, determine a transmission policy based at least partially on the QoS-Subtype value, wherein the transmission policy includes a transmission rate with a modulation and coding scheme (MCS) index based at least partially on the QoS-Subtype, and transmit a transmission to an accessory device according to the transmission policy.

In some embodiments, an accessory device includes a processor, a wireless communication device in data communication with the processor, and a hardware storage device in data communication with the processor. The hardware storage device includes instructions stored thereon that, when executed by the processor, causes the host device to compare a QoS-Subtype value to a matching rule of a policy table stored on the hardware storage device, determine a transmission policy based at least partially on the QoS-Subtype value, wherein the transmission policy includes a transmission rate with an MCS index based at least partially on the QoS-Subtype, and transmit a transmission to a host device according to the transmission policy.

This Summary is provided to introduce a selection of concepts in a simplified form that are further described below in the Detailed Description. This Summary is not intended to identify key features or essential features of the claimed subject matter.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which:

FIG. 4 is an example modulation and coding scheme (MCS) table, according to at least some embodiments of the present disclosure;

DETAILED DESCRIPTION

The present disclosure generally relates to systems and methods for communicating data between one or more accessory devices and a host device. The accessory device is an electronic device that communicates data with the host devices through a wireless communication. A user interacts with the accessory device to provide inputs to the host device and/or receive information from the host device. For example, an accessory device such as a game controller may receive manual inputs from the user on one or more buttons, switches, sticks, etc. and relay the state data to the host device. In another example, an accessory device such as a headset may receive audio data from the host device and play audio sounds to the user. In at least one example, the accessory device is a game controller that both transmits state data (related to user inputs) and chat audio data (collected by the game controller) to the host device and receives game haptic data from the host device, which may be subsequently generated for the user by the accessory device.

Figure 1:
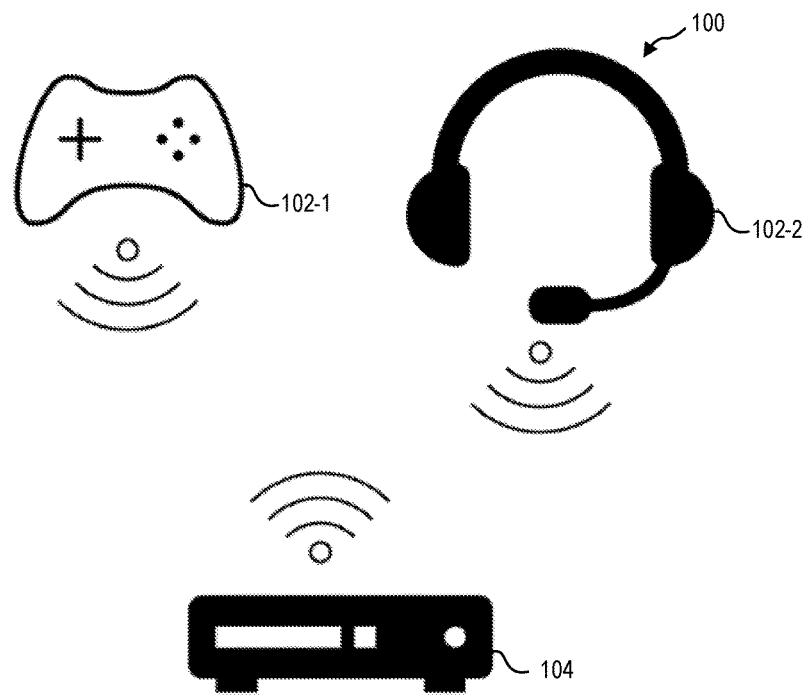
FIG. 1 is a schematic representation of a wireless communication system, according to at least some embodiments of the present disclosure.

FIG. 1 illustrates an example system 100 of accessory devices 102-1, 102-2 communicating with a host device 104. The accessory device 102-1, 102-2 may be configured to wirelessly communicate with a plurality of host devices 104 using different communication methods and stored data channel personalities for those different communication methods. A plurality of accessory devices, such as game controllers, speakers, headsets, keyboards, joysticks, and other human interface devices (HID) pair to a host device and share a bandwidth for communication with the host device through time multiplexing.

In some embodiments, an accessory device 202 includes a processor 206 in communication with a hardware storage device 208. The hardware storage device 208 can be any non-transient computer readable medium that may store instructions thereon. The hardware storage device 208 may be any type of solid-state memory; volatile memory, such as static random access memory (SRAM) or dynamic random access memory (DRAM); non-volatile memory, such as read-only memory (ROM) including programmable ROM (PROM), erasable PROM (ERPOM) or EEPROM; magnetic storage media, such as magnetic tape; a platen-based storage device, such as hard disk drives; optical media, such as compact discs (CD), digital video discs (DVD), Blu-ray Discs, or other optical media; removable media such as USB drives; non-removable media such as internal SATA or non-volatile memory express (NVMe) style NAND flash memory; or any other non-transient storage media. The hardware storage device 208 includes instruction stored thereon that, when executed by the processor 206, cause the accessory device 202 to perform any method or part of a method described herein. The hardware storage device 208 or another hardware storage device has, stored thereon, at least one data channel personality.

The accessory device 202 further includes a wireless communication device 210, such as a 802.11 ax radio frequency (RF) transceiver, which allows wireless transmission and receipt of data to the host device and/or control device. In some embodiments, the accessory device 202 has a plurality of wireless communication devices 210 that provide communication at different frequencies or power levels to communicate with different host devices and/or control devices.

The data channel provides communication of state data, audio data, and other frequent communications between the accessory device 202 and a host device. In some embodiments, the accessory device 202 also communicates via a control channel with a control application that provides instructions to the accessory device to change data channel personality. In some embodiments, the control channel may broadcast other device information to the control application, such as current or available stored data channel personalities, current battery status of the accessory device 202, RSSI signal strength, or other functions. In some embodiments, the accessory device has at least one input mechanism 212 locally on the accessory device to select, cycle through, or otherwise change the data channel personality. In embodiments with a control channel, the control channel allows for the communication of latency-tolerant data transmission, while the data channel handles latency-critical information. As the data channel handles latency-critical information, additional accessory devices sharing the bandwidth may create delays in transmission due to time multiplexing.

Figure 3:
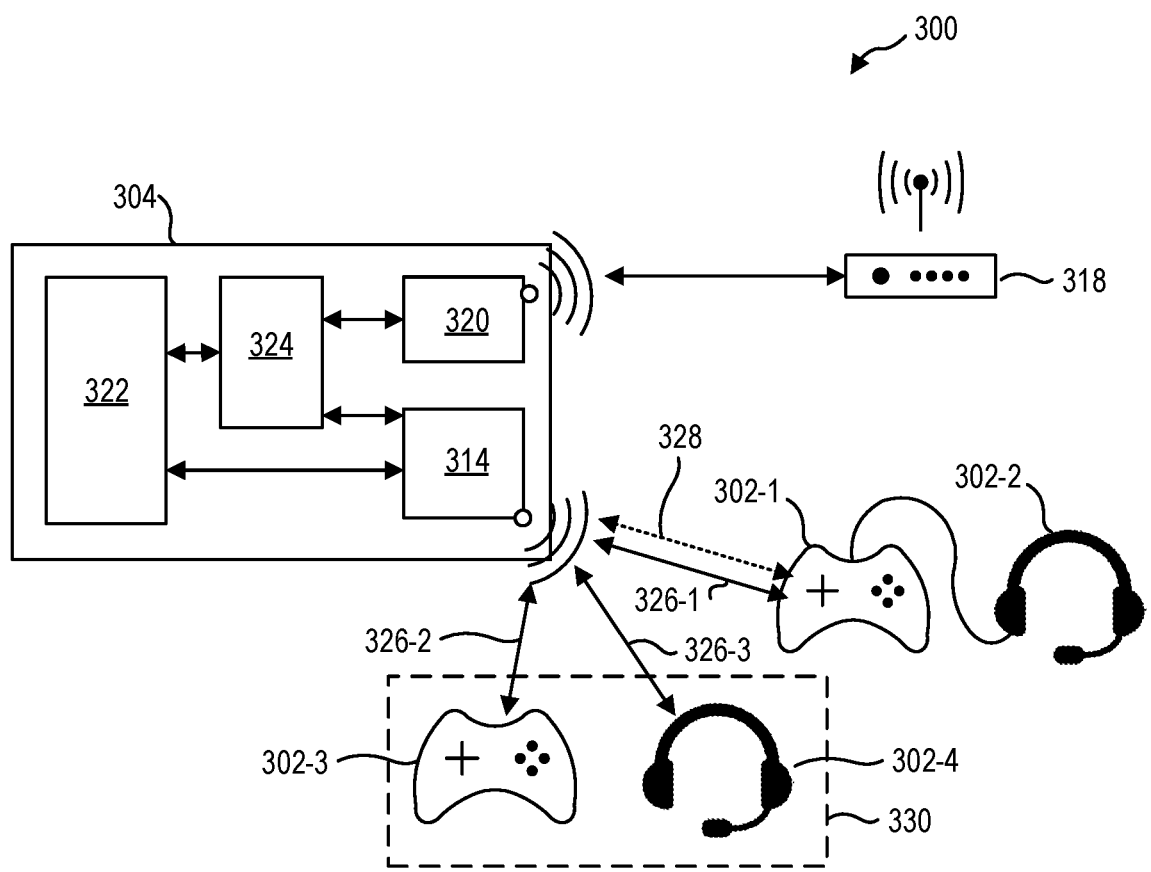
FIG. 3 is a schematic representation of wireless communication channels, according to at least some embodiments of the present disclosure.

Referring now to FIG. 3, an embodiment of a system 300 is illustrated with a host device 304 (e.g., a game console) in communication with a first accessory device 302-1 via an accessory radio 314. The host device 304 is also in data communication with a network 316 through an access point 318 via a network radio 320. A main processor or main SOC 322 of the host device 304 is indirectly connected to the network radio 320 and accessory radio 314 on the through Peripheral Component Interconnect Express (PCIe) or another hardware connection standard.

The Low Power Radio Control ASIC 324 is a device that provides a PCIe pass-through using a non-transparent bridge topology when operating normally. In a low power state (e.g., regulatory-standby), the main SOC 322 will be powered off and network control will be managed by the low power radio control ASIC 324. In this state, the PCIe link will not be used as a pass-through to the main SOC 322, rather the low power radio control ASIC 324 will manage all network connectivity. The low power radio control ASIC 324 may manage wake events and filter network traffic while also ensuring network functionality is maintained. The low power radio control ASIC 324 may use a processor and embedded SRAM or other memory to host enough of the network functionality to respond to certain events and wake the main SOC 322. During a low power mode, the accessory radio 314 may not be managed by the low power radio control ASIC 324. Waking a console in a low power state from the first accessory device 302-1 will rely on the accessory radio 314 responding to a wake signal or beacon from the accessory device 302 and then alerting the main SOC 322 via an in-band or out-of-band signal to wake.

In some embodiments, the host device 302 establishes a first data channel 326-1 between the first accessory device 302-1 (and wireless communication device thereof) and the accessory radio 314 of the host device 304. In some embodiments, a control channel 328 is also established using the accessory radio 314. The first data channel 326-1 carries latency-sensitive information between the first accessory device 302-1 and the host device 304 to provide the user with responsive and immersive interaction with a host application running on (or accessed through) the host device 304. For example, some game consoles or personal computers can render game applications and the game environments thereof at framerate at or above 120 frames per second. In such examples, each frame lasts only 8.33 milliseconds (ms). In another example, a game environment rendered at 60 FPS has a 16.67 ms frame time. Delays in communications over the data channel 326-1 can therefor cause inputs to be received after the intended state of the game environment. In a particular example, a 30 ms delay in communicating a user input can cause the user input to arrive at the host device 304 two to three frames after the button is pressed by the user.

In conventional systems using time multiplexing, additional devices using the frequencies of the first data channel 326-1 can cause traffic or congestion on the first data channel 326-1 that slows the transmission of the data. For example, multiple accessory devices sharing the bandwidth for data channels with the accessory radio 314 can cause additional delays. In other examples, devices or radios broadcasting on the same frequency that are not part of the system 300 can cause additional delays in communication.

The first accessory device 302-1 transmits user input data, such as input device state data, to the host device 304 via the first data channel 326-1. In some embodiments, the first accessory device 302-1 is in wired data communication with a second accessory device 302-2. The host device 304 communicates other data, such as game audio data, to the first accessory device 302-1 to be subsequently transmitted to the second accessory device 302-2 via the first accessory device 302-1. The first accessory device 302-1 is also configured to receive data from the second accessory device 302-2, such as chat audio data, to be wirelessly transmitted to the host device 304 via the first data channel 326-1. In some embodiments, the first data channel 326-1, therefore, is used to communicate additional different types of data for two different accessory devices (i.e., the first accessory device 302-1 and second accessory device 302-2). The different types of data may have different priorities and/or latency dependencies.

In some embodiments, the first accessory device 302-1 is in wireless data communication with the second accessory device 302-2. A relay transmission may be received by the first accessory device 302-1 from the host device 304 and relayed by the first accessory device 302-1 to the second accessory device 302-2. In some embodiments, the relay transmission is transmitted by the first accessory device 302-1 to the second accessory device 302-2 with a different transmission policy than that used by the host device to transmit the relay transmission to the first accessory device 302-1. In some embodiments, the different transmission policy includes a different modulation and coding scheme (MCS) index.

In some embodiments, a third accessory device 302-3 is in wireless data communication with the host device 304 via the accessory radio 314 while a fourth accessory device 302-4 is also in wireless data communication with the host device 304 via the accessory radio 314. The third accessory device 302-3 and fourth accessory device 302-4 illustrate an embodiment of a hub-spoke model for network topology. A hub-spoke model for a system 300 requires the establishment of a different data channel for each accessory device 302-3, 302-4 with the host device 304. The third accessory device 302-3 and fourth accessory device 302-4 are associated as a pairing 330 that have associated information, such as haptic information sent to the third accessory device 302-3 via the second data channel 326-2 and game audio information, which is intended to be synchronized to the haptic information, is sent to the fourth accessory device 302-4 via the third data channel 326-3.

In other embodiments, a mesh-type network allows the third accessory device 302-3 to act as a node relay to the fourth accessory device 302-4 (e.g., a game controller acting as a node relay to a headset). In some embodiments, a mesh introduces latency and complications in mesh routing, mesh security, and mesh reliability. A mesh also complicates predictable and sustained bandwidth quality of service. However, a hub-spoke model introduces many individual data channels to communicate with the host device 304. A game console may communicate with 8 or more accessory devices (e.g., accessory devices 302-1, 302-2, 302-3, 302-4, etc.) located in a small area in the example of local or "couch" multiplayer events. In such examples, conventional time-based multiplexing or wait-to-talk communication can introduce delays, which increase with the quantity of accessory devices sharing the frequencies.

When the host device 304 and accessory devices 302-1, 302-2, 302-3, 302-4 are communicating, different types of data can be assigned different priorities in the radio communications. For example, conventional systems assign Quality of Service (QoS) values to packages of information transmitted by the radios. In some embodiments, the QoS value is based at least partially on the devices communicating. In some embodiments, the QoS value is based at least partially on the category of data being transmitted. For example, a QoS of 0 (the highest priority) may be assigned to any data transmitted between a game controller (i.e., the first accessory device 302-1) and the host device because user inputs to the game application are latency critical. A QoS of 1 (high priority but lower than a QoS of 0 in the priority queue) may be assigned to chat audio information, meaning that the first accessory device 302-1 will prioritize the transmission of input device state data from the first accessory device 302-1 over the transmission of chat audio, when the available RF space has traffic thereon. In other examples, system information, such as described in relation to the control channel 328, may be assigned a QoS of 2 or 3, as the system information is latency-independent.

However, conventional QoS values differentiate priority of communications only upon latency dependency. In some embodiments, latency-dependent transmissions are further sub-categorized by packet delivery reliability or loss tolerance. For example, some transmissions are latency-critical but loss-tolerant, such as chat audio, to ensure the synchronization of chat audio to the events of the game application displayed on a display connected to the host device. Other transmissions are latency-critical and loss-intolerant, such as user inputs. A failed transmission of chat audio causes a stutter in the audio communicated to another user, while, as described herein, a dropped transmission of user inputs causes unintended actions in the game application adversely affecting the user's ability to play the game. The impact to a user's experience is greater with a dropped button input than a dropped chat audio transmission.

In some embodiments, the host device and/or accessory device(s) according to the present disclosure use a different physical layer (PHY layer) data rates for different transmissions within a QoS level. For example, the host device and/or accessory device(s) according to the present disclosure use QoS-Subtypes that split a single QoS value along multiple dimensions. The QoS value can provide latency differentiation in transmission priority, while each QoS-Subtype informs the manner in which the data is transmitted and/or the priority within a single QoS level. Conventionally, a host device and accessory device will negotiate a set of PHY layer parameters based on highest data rate supported by the host device, the accessory device, and the environment (e.g., the RF space and the physical space through which the host device and accessory device transmit).

An MCS is a set of transmission parameters supported by an AP and a client to adjust the data rate and robustness of transmissions therebetween. An MCS index includes settings for modulation, coding, guard interval, channel width, and other parameters. Higher MCS indexes provide higher data rate but less robust transmissions (e.g., more prone to errors). For example, a coding value for a first MCS index is ½, meaning that each transmission includes 2 bits of data, but only 1 needs to be received for the transmission to succeed. In other examples, a coding value for a second MCS index is ⅚, meaning that each transmission includes 6 bits of data, but 5 of the 6 need to be received for the transmission to succeed. While the second MCS index transmits more information that the first MCS index (i.e., has a higher data rate), a transmission using the second MCS index is more brittle and prone to failure.

Controller state data is a relatively small amount of information to transmit but requires high reliability for a quality experience for the user. Chat audio data can leverage higher data rates to improve the sound quality of the chat audio data, while tolerating more failed transmission. A QoS-Subtype allows the state data to be transmitted by the game controller with a lower MCS index than the chat audio data, despite both being a QoS of 0. In some embodiments, different types of transmission can be subcategorized through the use of both QoS and a QoS-Subtype. For example, a host device and accessory device may transmit data therebetween according to:

Game Audio: QoS=0, QoS-Subtype=3 (MCS6) reliability 99%
Chat Audio: QoS=0, QoS-Subtype=4 (MCS7) reliability 95%
Video: QoS=0, QoS-Subtype=2 (MCS5) reliability 99.5%

Gaming Input, QoS=0, QoS-Subtype=1 (MCS 4), reliability 99.9%

Configuration Commands, QoS=0, QoS-Subtype=0 (MCS2), reliability 99.99%

Accessory device system information, QoS=1, QoS-Subtype=1 (MCS4), reliability 99.9%

FIG. 4 is an example of a MCS table 432 for single spatial stream connections that may be used by a transmitting device according to the present disclosure. In some embodiments, the MCS table provides communication parameters for transmitting data according to various values. In some examples, the MCS table 432 includes parameters for modulation 434, coding 436, channel width 438, guard interval 440 and other parameters that affect the data rate 442 and robustness of the transmission. Narrower data channels width 438 allows for lower data rates 442 but may experience less environmental interference. Lower coding 436 ratios allow for lower data rates 442 but provide more tolerance to data loss during transmission.

Figure 2:
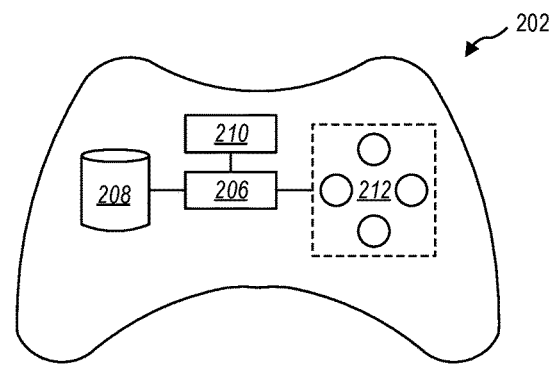
FIG. 2 is a schematic representation of an accessory device, according to at least some embodiments of the present disclosure.
Figure 5:
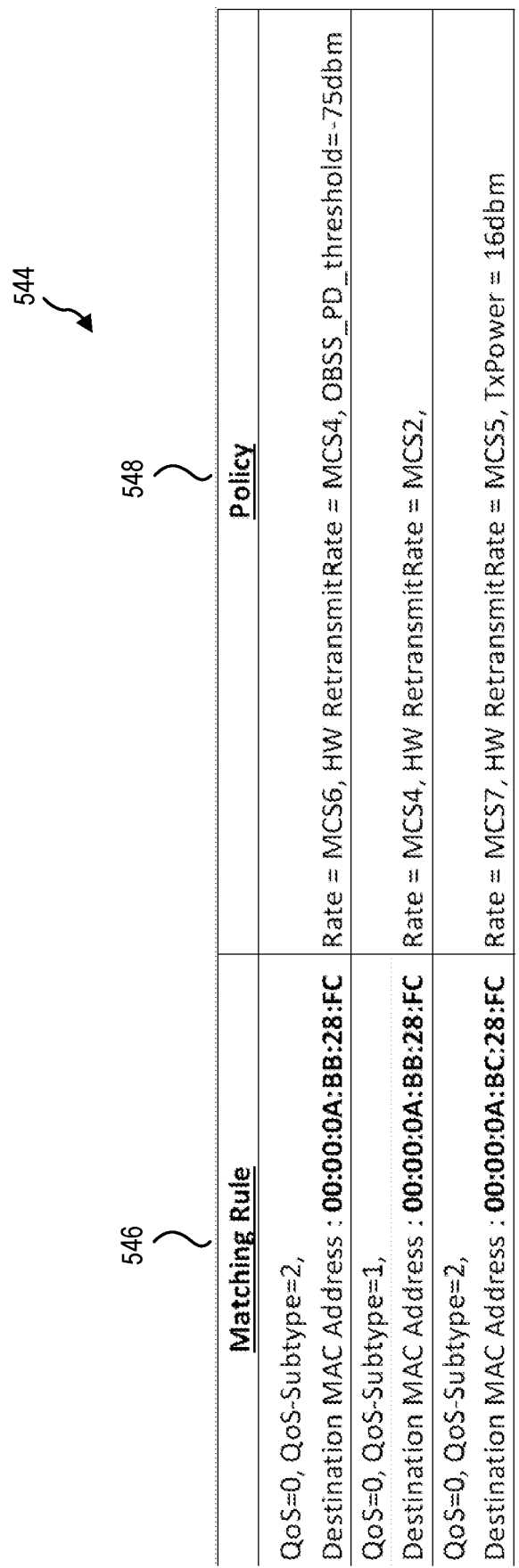
FIG. 5 is a policy table used by a transmitting device, according to at least some embodiments of the present disclosure.

The transmitting device transmits according to the QoS, the QoS-Subtype, the Destination MAC address, packet length (e.g., data payload length), or combinations thereof. A transmitting device can have stored thereon (such as on the main SOC 322 of the host device 304 of FIG. 3 or in the hardware storage device 208 of the accessory device 202 of FIG. 2) a MCS table 432 and a policy table, such as illustrated in FIG. 5. In some embodiments, a policy table 544 includes a matching rule 546 and an associate transmission policy 548. The matching rule allows the transmitting device to determine whether the type of data and/or the destination device is previously identified to the transmitting device.

For example, a transmitting game controller can have in the policy table 544 matching rules 546 for transmitting controller state data to a host device and transmitting audio chat data to the host device. For example, the matching rule 546 can include a QoS value, a QoS-Subtype value, packet length (e.g., data payload length), and a Destination MAC Address, allowing the transmitting game controller to look up a policy 548 for each type of transmission. A chat audio transmission is latency-critical and carries a QoS=0, but the chat audio transmission is more loss-tolerant than other transmissions and carries a QoS-Subtype=2. The matching rule 546 further includes a Destination MAC Address to confirm the policy 548 is that for a transmission to the host device specifically.

In some embodiments, the policy 548 may be different when the game controller (or other accessory device) is communicating with a different host device or another accessory device (in the example of a mesh network). For example, the audio chat data transmission may have the same QoS and QoS-Subtype values when transmitting to a game console or to a personal computer, but the policy table may include different policies for the same QoS and QoS-Subtype values when transmitting to different Destination MAC Addresses. In the provided example policy table 544, the chat audio data transmission with a QoS=0, a QoS-Subtype=0, and a Destination MAC Address of 00:00:0A:BB:28:FC matching rule 546 has a policy 548 of Rate MDS6, HW RetransmitRate=MCS4, and OBSS_PD_threshold=−75 dbm. The same QoS and QoS-Subtype with a different Destination MAC Address of 00:00:0A:BC:28:FC has a policy 548 of Rate=MCS7, HW RetransmitRate=MCS5, TxPower=16 dbm. When transmitting to the first destination MAC Address but with a QoS-Subtype=1 (such as a controller state data transmission), the policy 548 is Rate=MCS4, HW RetransmitRate=MCS2.

In some embodiments, the policy table includes different policies for the same QoS and QoS-Subtype values when the packet length is different. For example, the packet length or data payload length is the related to the amount of information in each data packet. In some example, the packet length can be as short as 21 bytes and as long as 65,535 bytes. In some embodiments, the policy assigns a different MCS value based at least partially on the packet length.

In some embodiments, the policy 548 includes a first MCS index for initial transmission attempts and a second MCS index for retransmission. The second MCS index may be a lower MCS index to provide a slower but more robust transmission. In some embodiments, the policy 548 further includes transmission power, BSS coloring parameters, and other transmission parameters. When a transmission does not match a known matching rule 546, the system uses a default policy 548 and/or series of policies 548.

Figure 6:
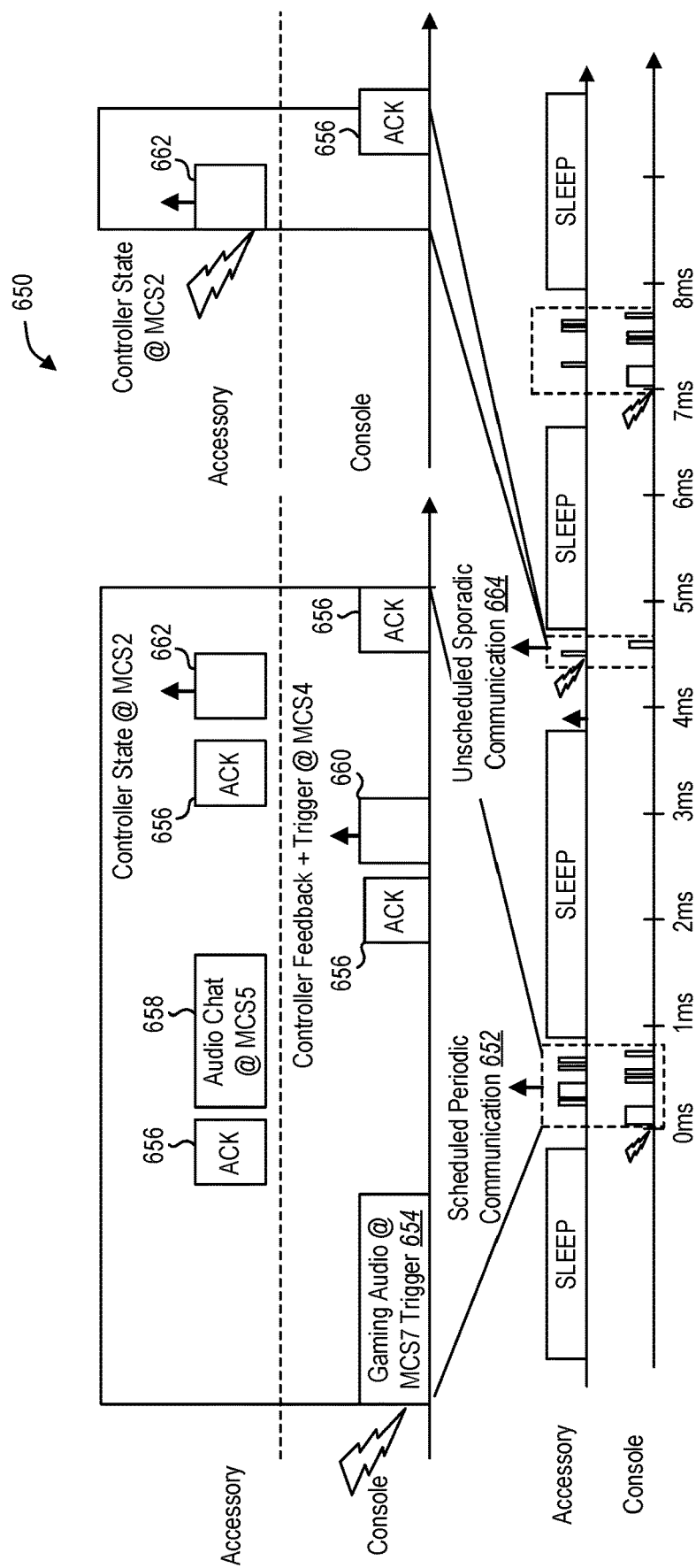
FIG. 6 is an example communication timing between a host device and an accessory device, according to at least some embodiments of the present disclosure.

FIG. 6 is an example communication timing 650 between a host device (e.g., host device 304 as described in relation to FIG. 3) and a game controller accessory device (e.g., first accessory device 302-1 as described in relation to FIG. 3). In some embodiments, at least a portion of the communication timing 650 is a series of scheduled periodic communication 652. In some embodiments, at least a portion of the communication timing 650 is a series of unscheduled sporadic communication 664.

The communications between the host device and the accessory device can have different policies, such as different rates (e.g., MCS2, MCS4, MCS5). In some embodiments, the scheduled periodic communication 652 includes data transmission from the host device to the accessory device and from the accessory device to the host device. For example, the game audio 654 may be transmitted from the host device to the accessory device at a rate of MCS7. In response to the game audio 654 transmission, the accessory device transmits an acknowledgement 656 before transmitting audio chat 658 with a rate of MCS5, providing lower data rates with greater transmission reliability than the game audio 654. In response to receiving the chat audio 658, the host device transmits an acknowledgement 656 and provides a feedback 660 transmission to the accessory device at a rate of MCS4. The accessory device responds to the feedback 660 transmission with another acknowledgement 656 and controller state data 662 at a high-reliability rate of MCS2. In comparison to the game audio 654 transmitted at MCS7, the controller state data 662 is a much smaller amount of data. The controller state data 662 can be sent with a lower data rate that provides higher reliability.

The unscheduled sporadic communication 664, in some embodiments, includes a transmission from the accessory device of the controller state data 662 at MCS2. In some embodiments, the radio of the accessory device contends in the RF space to transmit the controller state data 662, the QoS=0 of the controller state data 662 transmission provides priority, while a QoS-Subtype=0 instructs the radio to transmit at MCS2 to provide reliability. In some embodiments, the QoS-Subtype further provides priority amongst concurrent transmissions in a queue at the accessory device radio. While FIG. 6 illustrates an example communication timing 650 in which both the host device and the accessory device transmit according to QoS and QoS-Subtypes, in some embodiments, only one of the devices supports QoS-Subtypes. A system may use a combination of devices that support QoS-Subtypes with at least some of the transmissions benefitting from increased reliability of the QoS-Subtypes.

INDUSTRIAL APPLICABILITY

The present disclosure generally relates to systems and methods for communicating data between one or more accessory devices and a host device. The accessory device is an electronic device that communicates data with the host devices through a wireless communication. A user interacts with the accessory device to provide inputs to the host device and/or receive information from the host device. For example, an accessory device such as a game controller may receive manual inputs from the user on one or more buttons, switches, sticks, etc. and relay the state data to the host device. In another example, an accessory device such as a headset may receive audio data from the host device and play audio sounds to the user. In at least one example, the accessory device is a game controller that both transmits state data (related to user inputs) and chat audio data (collected by the game controller) to the host device and receives game haptic data from the host device, which may be subsequently generated for the user by the accessory device.

In some embodiments, an accessory device is configured to wirelessly communicate with a plurality of host devices using different communication methods and stored data channel personalities for those different communication methods. A plurality of accessory devices, such as game controllers, speakers, headsets, keyboards, joysticks, and other human interface devices (HID) pair to a host device and share a bandwidth for communication with the host device through time multiplexing.

In some embodiments, an accessory device includes a processor in communication with a hardware storage device. The hardware storage device can be any non-transient computer readable medium that may store instructions thereon. The hardware storage device may be any type of solid-state memory; volatile memory, such as static random access memory (SRAM) or dynamic random access memory (DRAM); non-volatile memory, such as read-only memory (ROM) including programmable ROM (PROM), erasable PROM (ERPOM) or EEPROM; magnetic storage media, such as magnetic tape; a platen-based storage device, such as hard disk drives; optical media, such as compact discs (CD), digital video discs (DVD), Blu-ray Discs, or other optical media; removable media such as USB drives; non-removable media such as internal SATA or non-volatile memory express (NVMe) style NAND flash memory; or any other non-transient storage media. The hardware storage device includes instruction stored thereon that, when executed by the processor, cause the accessory device to perform any method or part of a method described herein. The hardware storage device or another hardware storage device has, stored thereon, at least one data channel personality.

The accessory device further includes a wireless communication device, such as a 802.11 ax radio frequency (RF) transceiver, which allows wireless transmission and receipt of data to the host device and/or control device. In some embodiments, the accessory device has a plurality of wireless communication devices that provide communication at different frequencies or power levels to communicate with different host devices and/or control devices.

The data channel provides communication of state data, audio data, and other frequent communications between the accessory device and a host device. In some embodiments, the accessory device also communicates via a control channel with a control application that provides instructions to the accessory device to change data channel personality. In some embodiments, the control channel may broadcast other device information to the control application, such as current or available stored data channel personalities, current battery status of the accessory device, RSSI signal strength, or other functions. In some embodiments, the accessory device has at least one input mechanism locally on the accessory device to select, cycle through, or otherwise change the data channel personality. In embodiments with a control channel, the control channel allows for the communication of latency-tolerant data transmission, while the data channel handles latency-critical information. As the data channel handles latency-critical information, additional accessory devices sharing the bandwidth may create delays in transmission due to time multiplexing.

In some embodiments, an embodiment of a system includes a host device (e.g., a game console) in communication with a first accessory device via an accessory radio. The host device may be also in data communication with a network through an access point via a network radio. A main processor or main SOC of the host device is indirectly connected to the network radio and accessory radio on the through Peripheral Component Interconnect Express (PCIe) or another hardware connection standard.

The Low Power Radio Control ASIC is a device that provides a PCIe pass-through using a non-transparent bridge topology when operating normally. In a low power state (e.g., regulatory-standby), the main SOC will be powered off and network control will be managed by the low power radio control ASIC. In this state, the PCIe link will not be used as a pass-through to the main SOC, rather the low power radio control ASIC will manage all network connectivity. The low power radio control ASIC may manage wake events and filter network traffic while also ensuring network functionality is maintained. The low power radio control ASIC may use a processor and embedded SRAM or other memory to host enough of the network functionality to respond to certain events and wake the main SOC. During a low power mode, the accessory radio may not be managed by the low power radio control ASIC. Waking a console in a low power state from the first accessory device will rely on the accessory radio responding to a wake signal or beacon from the accessory device and then alerting the main SOC via an in-band or out-of-band signal to wake.

In some embodiments, the host device establishes a first data channel between the first accessory device (and wireless communication device thereof) and the accessory radio of the host device. In some embodiments, a control channel is also established using the accessory radio. The first data channel carries latency-sensitive information between the first accessory device and the host device to provide the user with responsive and immersive interaction with a host application running on (or accessed through) the host device. For example, some game consoles or personal computers can render game applications and the game environments thereof at framerate at or above 120 frames per second. In such examples, each frame lasts only 8.33 milliseconds (ms). In another example, a game environment rendered at 60 FPS has a 16.67 ms frame time. Delays in communications over the data channel can therefor cause inputs to be received after the intended state of the game environment. In a particular example, a 30 ms delay in communicating a user input can cause the user input to arrive at the host device two to three frames after the button is pressed by the user.

In conventional systems using time multiplexing, additional devices using the frequencies of the first data channel can cause traffic or congestion on the first data channel that slows the transmission of the data. For example, multiple accessory devices sharing the bandwidth for data channels with the accessory radio can cause additional delays. In other examples, devices or radios broadcasting on the same frequency that are not part of the system can cause additional delays in communication.

The first accessory device transmits user input data, such as input device state data, to the host device via the first data channel. In some embodiments, the first accessory device is in wired data communication with a second accessory device. The host device communicates other data, such as game audio data, to the first accessory device to be subsequently transmitted to the second accessory device via the first accessory device. The first accessory device is also configured to receive data from the second accessory device, such as chat audio data, to be wirelessly transmitted to the host device via the first data channel. In some embodiments, the first data channel, therefore, is used to communicate additional different types of data for two different accessory devices (i.e., the first accessory device and second accessory device). The different types of data may have different priorities and/or latency dependencies.

In some embodiments, the first accessory device is in wireless data communication with the second accessory device. A relay transmission may be received by the first accessory device from the host device and relayed by the first accessory device to the second accessory device. In some embodiments, the relay transmission is transmitted by the first accessory device to the second accessory device with a different transmission policy than that used by the host device to transmit the relay transmission to the first accessory device. In some embodiments, the different transmission policy includes a different MCS index.

In some embodiments, a third accessory device is in wireless data communication with the host device via the accessory radio while a fourth accessory device is also in wireless data communication with the host device via the accessory radio. The third accessory device and fourth accessory device illustrate an embodiment of a hub-spoke model for network topology. A hub-spoke model for a system requires the establishment of a different data channel for each accessory device with the host device. The third accessory device and fourth accessory device are associated as a pairing that have associated information, such as haptic information sent to the third accessory device via the second data channel and game audio information, which is intended to be synchronized to the haptic information, is sent to the fourth accessory device via the third data channel.

In other embodiments, a mesh-type network allows the third accessory device to act as a node relay to the fourth accessory device (e.g., a game controller acting as a node relay to a headset). In some embodiments, a mesh introduces latency and complications in mesh routing, mesh security, and mesh reliability. A mesh also complicates predictable and sustained bandwidth quality of service. However, a hub-spoke model introduces many individual data channels to communicate with the host device. A game console may communicate with 8 or more accessory devices (e.g., accessory devices, etc.) located in a small area in the example of local or "couch" multiplayer events. In such examples, conventional time-based multiplexing or wait-to-talk communication can introduce delays, which increase with the quantity of accessory devices sharing the frequencies.

When the host device and accessory devices are communicating, different types of data can be assigned different priorities in the radio communications. For example, conventional systems assign Quality of Service (QoS) indexes to packages of information transmitted by the radios. In some embodiments, the QoS value is based at least partially on the devices communicating. In some embodiments, the QoS value is based at least partially on the category of data being transmitted. For example, a QoS of 0 (the highest priority) may be assigned to any data transmitted between a game controller (i.e., the first accessory device) and the host device because user inputs to the game application are latency critical. A QoS of 1 (high priority but lower than a QoS of 0 in a priority queue) may be assigned to chat audio information, meaning that the first accessory device will prioritize the transmission of input device state data from the first accessory device over the transmission of chat audio, when the available RF space has traffic thereon. In other examples, system information, such as described in relation to the control channel, may be assigned a QoS of 2 or 3, as the system information is latency-independent.

However, conventional QoS values differentiate priority of communications only upon latency dependency. In some embodiments, latency-dependent transmissions are further sub-categorized by packet delivery reliability or loss tolerance. For example, some transmissions are latency-critical but loss-tolerant, such as chat audio, to ensure the synchronization of chat audio to the events of the game application displayed on a display connected to the host device. Other transmissions are latency-critical and loss-intolerant, such as user inputs. A failed transmission of chat audio causes a stutter in the audio communicated to another user, while, as described herein, a dropped transmission of user inputs causes unintended actions in the game application adversely affecting the user's ability to play the game. The impact to a user's experience is greater with a dropped button input than a dropped chat audio transmission.

In some embodiments, the host device and/or accessory device(s) according to the present disclosure use a different physical layer (PHY layer) data rates for different transmissions within a QoS level. For example, the host device and/or accessory device(s) according to the present disclosure use QoS-Subtypes that split a single QoS value along multiple dimensions. The QoS value can provide latency differentiation in transmission priority, while each QoS-Subtype informs the manner in which the data is transmitted and/or the priority within a single QoS level. Conventionally, a host device and accessory device will negotiate a set of PHY layer parameters based on highest data rate supported by the host device, the accessory device, and the environment (e.g., the RF space and the physical space through which the host device and accessory device transmit).

An modulation and coding scheme (MCS) is a set of transmission parameters supported by an AP and a client to adjust the data rate and robustness of transmissions therebetween. A MCS index includes settings for modulation, coding, guard interval, channel width, and other parameters. Higher MCS indexes provide higher data rate but less robust transmissions (e.g., more prone to errors). For example, a coding value for a first MCS index is ½, meaning that each transmission includes 2 bits of data, but only 1 needs to be received for the transmission to succeed. In other examples, a coding value for a second MCS index is ⅚, meaning that each transmission includes 6 bits of data, but 5 of the 6 need to be received for the transmission to succeed. While the second MCS index transmits more information that the first MCS index (i.e., has a higher data rate), a transmission using the second MCS index is more brittle and prone to failure.

Controller state data is a relatively small amount of information to transmit but requires high reliability for a quality experience for the user. Chat audio data can leverage higher data rates to improve the sound quality of the chat audio data, while tolerating more failed transmission. A QoS-Subtype allows the state data to be transmitted by the game controller with a lower MCS index than the chat audio data, despite both being a QoS of 0. In some embodiments, different types of transmission can be subcategorized through the use of both QoS and a QoS-Subtype. For example, a host device and accessory device may transmit data therebetween according to:

Game Audio: QoS=0, QoS-Subtype=3 (MCS6) reliability 99%
  Chat Audio: QoS=0, QoS-Subtype=4 (MCS7) reliability 95%
  Video: QoS=0, QoS-Subtype=2 (MCS5) reliability 99.5%
  Gaming Input, QoS=0, QoS-Subtype=1 (MCS 4), reliability 99.9%
  Configuration Commands, QoS=0, QoS-Subtype=0 (MCS2), reliability 99.99%
  Accessory device system information, QoS=1, QoS-Subtype=1 (MCS4), reliability 99.9%

In some embodiments, an MCS table provides communication parameters for transmitting data according to various values. In some examples, the MCS table includes parameters for modulation, coding, channel width, guard interval, and other parameters that affect the data rate and robustness of the transmission. Narrower data channels width allows for lower data rates but may experience less environmental interference. Lower coding ratios allow for lower data rates but provide more tolerance to data loss during transmission.

The transmitting device transmits according to the QoS, the QoS-Subtype, the Destination MAC address, a packet length, or combinations thereof. A transmitting device can have stored thereon (such as on the main SOC of the host device or in the hardware storage device of the accessory device) a MCS table and a policy table. In some embodiments, a policy table includes a matching rule and an associate transmission policy. The matching rule allows the transmitting device to determine whether the type of data and/or the destination device is previously identified to the transmitting device.

For example, a transmitting game controller can have in the policy table matching rules for transmitting controller state data to a host device and transmitting audio chat data to the host device. For example, the matching rule can include a QoS value, a QoS-Subtype value, a packet length, and a Destination MAC Address, allowing the transmitting game controller to look up a policy for each type of transmission. A chat audio transmission is latency-critical and carries a QoS=0, but the chat audio transmission is more loss-tolerant than other transmissions and carries a QoS-Subtype=2. The matching rule further includes a Destination MAC Address to confirm the policy is that for a transmission to the host device specifically.

In some embodiments, the policy may be different when the game controller (or other accessory device) is communicating with a different host device or another accessory device (in the example of a mesh network). For example, the audio chat data transmission may have the same QoS and QoS-Subtype values when transmitting to a game console or to a personal computer, but the policy table may include different policies for the same QoS and QoS-Subtype values when transmitting to different Destination MAC Addresses. In the provided example policy table, the chat audio data transmission with a QoS=0, a QoS-Subtype=0, and a Destination MAC Address of 00:00:0A:BB:28:FC matching rule has a policy of Rate MDS6, HW RetransmitRate=MCS4, and OBSS_PD_threshold=−75 dbm. The same QoS and QoS-Subtype with a different Destination MAC Address of 00:00:0A:BC:28:FC has a policy of Rate=MCS7, HW RetransmitRate=MCS5, TxPower=16 dbm. When transmitting to the first destination MAC Address but with a QoS-Subtype=1 (such as a controller state data transmission), the policy is Rate=MCS4, HW RetransmitRate=MCS2.

In some embodiments, the policy table includes different policies for the same QoS and QoS-Subtype values when the packet length is different. For example, the packet length or data payload length is the related to the amount of information in each data packet. In some example, the packet length can be as short as 21 bytes and as long as 65,535 bytes. In some embodiments, the policy assigns a different MCS value based at least partially on the packet length.

In some embodiments, the policy includes a first MCS index for initial transmission attempts and a second MCS index for retransmission. The second MCS index may be a lower MCS index to provide a slower but more robust transmission. In some embodiments, the policy further includes transmission power, BSS coloring parameters, and other transmission parameters. When a transmission does not match a known matching rule, the system uses a default policy and/or series of policies.

An example communication timing between a host device and a game controller accessory device can use QoS-Subtypes to improve transmission reliability and to reduce the need for retransmissions, which reduces latency. In some embodiments, at least a portion of the communication timing is a series of scheduled periodic communication. In some embodiments, at least a portion of the communication timing is a series of unscheduled sporadic communication.

The communications between the host device and the accessory device can have different policies, such as different rates (e.g., MCS2, MCS4, MCS5). In some embodiments, the scheduled periodic communication includes data transmission from the host device to the accessory device and from the accessory device to the host device. For example, the game audio may be transmitted from the host device to the accessory device at a rate of MCS7. In response to the game audio transmission, the accessory device transmits an acknowledgement before transmitting audio chat with a rate of MCS5, providing lower data rates with greater transmission reliability than the game audio. In response to receiving the chat audio, the host device transmits an acknowledgement and provides a feedback transmission to the accessory device at a rate of MCS4. The accessory device responds to the feedback transmission with another acknowledgement and controller state data at a high-reliability rate of MCS2. In comparison to the game audio transmitted at MCS7, the controller state data is a much smaller amount of data. The controller state data can be sent with a lower data rate that provides higher reliability.

The unscheduled sporadic communication, in some embodiments, includes a transmission from the accessory device of the controller state data at MCS2. In some embodiments, the radio of the accessory device contends in the RF space to transmit the controller state data, the QoS=0 of the controller state data transmission provides priority, while a QoS-Subtype=0 instructs the radio to transmit at MCS2 to provide reliability. In some embodiments, the QoS-Subtype further provides priority amongst concurrent transmissions in a queue at the accessory device radio. in some embodiments, only one of the devices supports QoS-Subtypes. A system may use a combination of devices that support QoS-Subtypes with at least some of the transmissions benefitting from increased reliability of the QoS-Subtypes.

The present disclosure relates to systems and methods of providing reliable and efficient wireless data transmission according to any of the sections below:

[A1] In some embodiments, a host device includes a processor, a wireless communication device in data communication with the processor, and a hardware storage device in data communication with the processor. The hardware storage device has instructions stored thereon that, when executed by the processor, cause the host device to compare a Quality of Server Subtype (QoS-Subtype) value to a matching rule of a policy table stored on the hardware storage device, determine a transmission policy based at least partially on the QoS-Subtype value, wherein the transmission policy includes a transmission rate with a modulation and coding scheme (MCS) index based at least partially on the QoS-Subtype, and transmit a transmission to an accessory device according to the transmission policy.

[A2] In some embodiments, the transmission policy of [A1] further includes a retransmission rate with a different MCS index than the transmission rate.

[A3] In some embodiments, the transmission policy of [A1] or [A2] includes a transmission power value.

[A4] In some embodiments, the matching rule of any of [A1] through [A3] includes a Quality of Service (QoS) value.

[A5] In some embodiments, the matching rule of any of [A1] through [A4] includes a Destination MAC Address.

[A6] In some embodiments, the matching rule of any of [A1] through [A5] includes a packet length.

[A7] In some embodiments, the transmission policy of any of [A1] through [A6] includes an OBSS PD threshold value.

[A8] In some embodiments, the host device of any of [A1] through [A7] is a video game console.

[B1] In some embodiments, an accessory device includes a processor, a wireless communication device in data communication with the processor, and a hardware storage device in data communication with the processor. The hardware storage device has instructions stored thereon that, when executed by the processor, cause the accessory device to compare a QoS-Subtype value to a matching rule of a policy table stored on the hardware storage device, determine a transmission policy based at least partially on the QoS-Subtype value, wherein the transmission policy includes a transmission rate with an MCS index based at least partially on the QoS-Subtype, and transmit a transmission to a host device according to the transmission policy.

[B2] In some embodiments, the transmission policy of [B1] further includes at least one of: a retransmission rate with a different MCS index than the transmission rate, a transmission power value, and an OBSS PD threshold value.

[B3] In some embodiments, the matching rule of [B1] or [B2] further includes at least one of a Quality of Service (QoS) value, a Destination MAC Address, and a packet length.

[B4] In some embodiments, the accessory device of any of [B1] through [B3] is a game controller.

[C1] In some embodiments, a wireless communication system includes a host device and an accessory device. The host device includes a processor, a wireless communication device in data communication with the processor, and a hardware storage device in data communication with the processor. The hardware storage device has instructions stored thereon that, when executed by the processor, cause the host device to compare a QoS-Subtype value to a matching rule of a policy table stored on the hardware storage device, determine a transmission policy based at least partially on the QoS-Subtype value, wherein the transmission policy includes a transmission rate with an MCS index based at least partially on the QoS-Subtype, and transmit a transmission to the accessory device according to the transmission policy. The accessory device includes a processor, a wireless communication device in data communication with the processor, and a hardware storage device in data communication with the processor. The hardware storage device has instructions stored thereon that, when executed by the processor, cause the accessory device to compare a QoS-Subtype value to a matching rule of a policy table stored on the hardware storage device, determine a transmission policy based at least partially on the QoS-Subtype value, wherein the transmission policy includes a transmission rate with an MCS index based at least partially on the QoS-Subtype, and transmit a transmission to the host device according to the transmission policy.

[C2] In some embodiments, the accessory device of [C1] is a first accessory device, and the system further includes a second accessory device in data communication with the first accessory device.

[C3] In some embodiments, the second accessory device of [C2] is in wireless data communication with the first accessory device.

[C4] In some embodiments, the first accessory device of [C2] is configured to relay a relay transmission to the second accessory device received from the host device.

[C5] In some embodiments, the relay transmission of [C4] is transmitted from the first accessory device with a different transmission policy than received from the host device.

[C6] In some embodiments, the different transmission policy of [C5] includes a different MCS index.

[C7] In some embodiments, the second accessory device of any of [C2] through [C6] is in wired data communication with the first accessory device.

[C8] In some embodiments, the accessory device of [C1] is a first accessory device, and the system further comprises a second accessory device in wireless data communication with the host device.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the scope of the present disclosure, and that various changes, substitutions, and alterations may be made to embodiments disclosed herein without departing from the scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

It should be understood that any directions or reference frames in the preceding description are merely relative directions or movements. For example, any references to "front" and "back" or "top" and "bottom" or "left" and "right" are merely descriptive of the relative position or movement of the related elements.

The present disclosure may be embodied in other specific forms without departing from its characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A host device comprising:
a processor;
a wireless communication device in data communication with the processor; and
a hardware storage device in data communication with the processor, the hardware storage device having instructions stored thereon that, when executed by the processor, cause the host device to:
determine a particular Quality of Service (QoS) value and a particular QoS-Subtype value for a particular transmission;
compare the particular QoS value and the particular QoS-Subtype value to a policy table stored on the hardware storage device and identify a particular matching rule in the policy table for the particular QoS value and the particular QoS-Subtype value, the policy table having at least one other rule for other transmissions having the particular QoS value with a different QoS-Subtype value;
determine a particular transmission policy based at least partially on the particular matching rule, wherein the particular transmission policy includes a particular transmission rate with a particular modulation and coding scheme (MCS) index based at least partially on the particular QoS-Subtype value; and
transmit the particular transmission to an accessory device according to the particular transmission policy.

2. The host device of claim 1, wherein the particular transmission policy further includes a particular retransmission rate with a different MCS index than the particular transmission rate.

3. The host device of claim 1, wherein the particular transmission policy further includes a transmission power value.

4. The host device of claim 1, wherein the particular QoS value is 0, the particular QoS-Subtype value is 1, and the different QoS-Subtype value is 2.

5. The host device of claim 1, wherein:
the particular matching rule is associated with a particular destination Medium Access Control (MAC) address, and
the policy table has a further rule for further transmissions having the particular QoS value, the particular QoS-Subtype value, and a different destination MAC Address.

6. The host device of claim 1, wherein the particular matching rule further includes a packet length.

7. The host device of claim 1, wherein the particular transmission policy further includes an overlapping basic service set packet detection threshold value.

8. The host device of claim 1, wherein the host device is a video game console.

9. An accessory device comprising:
a processor;
a wireless communication device in data communication with the processor; and
a hardware storage device in data communication with the processor, the hardware storage device having instructions stored thereon that, when executed by the processor, cause the accessory device to:
determine a particular Quality of Service (QOS) value and a particular QoS-Subtype value for a particular transmission;
compare the particular QoS value and the particular QoS-Subtype value to a policy table stored on the hardware storage device and identify a particular matching rule in the policy table for the particular QoS value and the particular QoS-Subtype value, the policy table having at least one other rule for other transmissions having the particular QoS value with a different QoS-Subtype value;
determine a particular transmission policy based at least partially on the particular matching rule, wherein the particular transmission policy includes a particular transmission rate with a particular modulation and coding scheme (MCS) index based at least partially on the particular QoS-Subtype value; and
transmit the particular transmission to a host device according to the particular transmission policy.

10. The accessory device of claim 9, wherein the particular transmission policy further includes at least one of: a retransmission rate with a different MCS index than the particular transmission rate, a transmission power value, or a packet detection threshold value.

11. The accessory device of claim 9, wherein the particular matching rule further includes at least one of a packet length or a destination media access control address of the host device.

12. The accessory device of claim 9, wherein the accessory device is a game controller.

13. A system comprising:
a host device; and
an accessory device,
the host device including:
a host processor;
a host wireless communication device in data communication with the host processor; and
a host hardware storage device in data communication with the host processor, the host hardware storage device having host instructions stored thereon that, when executed by the host processor, cause the host device to:
determine a first Quality of Service (QOS) value and a first QoS-Subtype value for a first transmission;

compare the first QoS value and the first QoS-Subtype value to a host policy table stored on the host hardware storage device and identify a first matching rule in the host policy table for the first QoS value and the first QoS-Subtype value, the host policy table having at least one other rule for other transmissions having the first QoS value with a different QoS-Subtype value;

determine a first transmission policy based at least partially on the first matching rule, wherein the first transmission policy includes a first transmission rate with a first modulation and coding scheme (MCS) index based at least partially on the first QoS-Subtype value; and transmit the first transmission to the accessory device according to the first transmission policy; and the accessory device including:

an accessory processor;

an accessory wireless communication device in data communication with the accessory processor; and an accessory hardware storage device in data communication with the accessory processor, the accessory hardware storage device having instructions stored thereon that, when executed by the accessory processor, cause the accessory device to:

determine a second Quality of Service value and a second QoS-Subtype value for a second transmission;

compare the second QoS value and the second QoS-Subtype value to an accessory policy table stored on the accessory hardware storage device and identify a second matching rule in the accessory policy table for the second QoS value and the second QoS-Subtype value, the accessory policy table having at least one other rule for other transmissions having the second QoS value with a different QoS-Subtype value;

determine a second transmission policy based at least partially on the second matching rule, wherein the second transmission policy includes a second transmission rate with a second modulation and coding scheme (MCS) index based at least partially on the second QoS-Subtype value; and transmit the second transmission to the host device according to the second transmission policy.

14. The system of claim 13, wherein the accessory device is a first accessory device, and the system further comprises a second accessory device in data communication with the first accessory device.

15. The system of claim 14, wherein the second accessory device is in wireless data communication with the first accessory device.

16. The system of claim 14, wherein the first accessory device is configured to relay a relay transmission to the second accessory device received from the host device.

17. The system of claim 16, wherein the relay transmission is transmitted from the first accessory device with a different transmission policy than received from the host device.

18. The system of claim 17, wherein the different transmission policy includes a different MCS index.

19. The system of claim 14, wherein the second accessory device is in wired data communication with the first accessory device.

20. The system of claim 13, wherein the accessory device is a first accessory device, and the system further comprises a second accessory device in wireless data communication with the host device.

* * * * *